United States Patent [19]
Popenoe

[11] 3,987,668
[45] Oct. 26, 1976

[54] LIGHT REFLECTIVE OPTI-MECHANICAL DISPLACEMENT MICROINDICATOR

[76] Inventor: Charles H. Popenoe, 6307 Wiscasset Road, Bethesda, Md.

[22] Filed: Nov. 17, 1975

[21] Appl. No.: 632,838

[52] U.S. Cl. .......................... 73/88 F; 116/DIG. 34; 116/124 R
[51] Int. Cl.² .......................................... G01L 1/24
[58] Field of Search ................ 73/88 F; 116/114 R, 116/DIG. 34, 124 R; 350/96 R

[56] References Cited
UNITED STATES PATENTS

| | | | |
|---|---|---|---|
| 2,437,555 | 3/1948 | Rees | 116/124 R |
| 3,799,108 | 3/1974 | Mosow | 73/88 F |
| 3,817,204 | 6/1974 | Schittek | 116/114 R |

*Primary Examiner*—Jerry W. Myracle
*Attorney, Agent, or Firm*—George J. Neilan

[57] ABSTRACT

An indicator for optically indicating small displacements or changes in displacement of one member relative to another member, comprising a light transmitting member having a faceted light reflective under surface, and an opaque, light absorbing member disposed beneath the light transmitting member, whereby when the two members are separated by a thin film of air, incident light transmitted through the transmitting member is totally internally reflected at the under surface displaying a bright appearance to an observer. When the two members are forced into intimate contact by a displacement to be indicated, the incident light is absorbed by the second member and a dark appearance is presented to an observer. The light absorbing member's upper surface may be a negative replica of the under surface of the transmitting member in which case an abrupt change in transmitted light is observable upon a displacement, or the absorbing member may have a flat upper surface formed of an elastomeric material so that there is a gradually increasing area of contact between the two members and a more gradual change in appearance from bright to dark.

13 Claims, 6 Drawing Figures

LIGHT REFLECTIVE OPTI-MECHANICAL DISPLACEMENT MICROINDICATOR

BACKGROUND OF THE INVENTION

The present invention relates to displacement indicators and, more particularly, to opti-mechanical indicators by means of which very small displacements or movements of one member relative to another are visually indicated via a change in intensity or color of an indicator.

There are many situations where the indication of very small distances of displacements is needed. In the past, precision gauging instruments, such as micrometers, dial indicators, feeler gages, and electronic indicators were required to accomplish the precise setting or indicating of minute displacements in the order of 0.001 inch (25 $\mu$) or less. It would obviously be preferable, especially in the field, if such instruments or gages were not needed, and if the adjustments could be visually set to within acceptable limits with the aid of a built-in indicating device, and could also be quickly inspected for a proper condition visually and without contact at a subsequent time.

One form of simplified indicator known in the prior art is a stress-strain indicator of the type described in my U.S. Pat. No. 3,602,186. Indicators of this known type employ a light absorbing indicator fluid and have provision for varying the thickness of the indicator fluid so as to vary the transmission of light therethrough. The utilization of such strain indicators more fully than at present has been hindered by such factors as cost, and complexity in design and manufacture. There is a recognized need for improved, economical microindicators.

SUMMARY OF THE INVENTION

The primary object of the present invention is to provide a novel, economical displacement indicator. Another object of the invention is to provide a novel and sensitive displacement indicator which does not utilize a light-absorbing indicator fluid. Still another object of the present invention is to provide a novel displacement indicator which employs the principle of frustrated total internal reflection from the under surface of one or two cooperating members of the indicator to provide a sensitive visual indication.

Briefly, a microindicator of the present invention may comprise a light transparent first member which has microprism reflectors formed in its under surface, and a second member which is opaque and light absorbing disposed adjacent the under surface of the first member. When the two facing surfaces of these members are separated by a thin film of air, the majority of the incident light transmitted through the first member is totally internally reflected at its under surface, and presents a bright appearance to the observer. The facing surface of the light absorbing member may be the negative replica of the reflective surface of the first member. When the two members are forced into intimate physical contact due to a change in displacement, the light is not reflected but instead is transmitted to and absorbed in the opaque material of the second member, presenting a dark appearance to the observer. Under ideal conditions, the change from bright to dark is herein shown to occur within a relative movement on the order of 1 wavelength of the illuminating light between the two members. The two indicator members are connected to the elements whose relative displacement is to be indicated so that any relative displacement causes a repositioning of the light reflective member and the light absorbing member relative to each other.

If the light absorbing member has a flat resilient upper surface, a more gradual change from light to dark occurs as the reflective surface of the upper member is gradually forced into a greater area of contact with the resilient light absorbing member. In such an embodiment the brightness of the indicator is proportional to the amount of displacement, as opposed to a more rapid transition from light to dark when the upper surface of the light absorbing member is perfectly fitting negative replica of the reflective surface.

It is also within the scope of the invention to provide indicia on the upper surface of the light absorbing member so that a message may be displayed upon indication.

The above and other objects, features and advantages of this invention will become more apparent as this description proceeds.

DETAILED DESCRIPTION OF THE INVENTION

Figure 1:
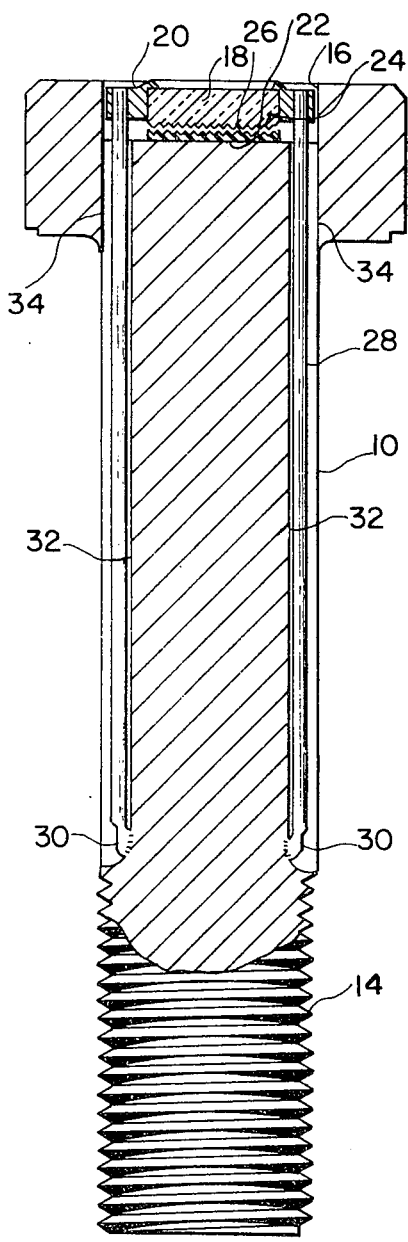
FIG. 1 is an elevational partial cross-sectional view of one embodiment of the invention showing the indicator incorporated into a tension-indicating fastener.

Referring now to the drawings and more particularly to FIG. 1, reference numeral 10 generally designates a tension-indicating fastener or bolt containing an indicator in accordance with the present invention. The bolt has a head 12 in the form of a square or hexagon so that it can be turned, and a lower threaded end 14. A recess 16 is formed into the head 12 to provide a protected location for the indicator elements. The microindicator of the invention comprises a light-transmitting member 18 fastened with a ferrule 20 as by swaging or an adhesive, and a light absorbing member 22 attached to the bottom of recess 16. Light tramsitting member 18 has faceted light reflecting surfaces 24 formed into its under surface. These surfaces are formed at the proper angle such that the incident illumination will largely be totally internally reflected. Normally, if retroreflective properties are desired, the reflecting surfaces 24 would be formed in the shape of corner-cube microprisms such as are employed in a commercially available flexible material known as Reflexite, described in U.S. Pat. No. 3,684,348. The size of these reflecting microprisms is greatly exaggerated in all of the drawings for clarity. Typically, the side edge dimensions of the microprisms would be on the order of several thousandths of an inch, and would rarely exceed 0.025 inch in size. Less directional reflective properties would require other effective surface microprism arrangements or configurations, for instance, employing an included angle of 16° rather than 90°. This angle is commonly used in molded clear plastic articles to add sparkle due to internal reflections. Other angles or prism orientations may be used for different applications, but would typically be less than 0.025 inch in maximum dimension.

The light absorbing member 22 has its upper surface 26 formed into a closely fitting negative replica of the adjacent light reflecting surfaces 24 of member 18. The indicator of FIG. 1 is shown having an air gap slightly separating the surfaces 24 and 26, which would allow any radiation incident on the indicator to be largely totally internally reflected back through transmitting member 18 presenting a bright appearance to an observer. On the other hand, if there is a relative displacement between members 18 and 22 causing the air gap to be diminished, and the surfaces 24 and 26 are in contact or very nearly in contact, the incident illumination will no longer be reflected and will pass through surface 24 and be absorbed in member 22, thus presenting a dark appearance of the indicator to an observer.

The principle of frustrated total internal reflection upon which the invention is based is well known and will be only briefly summarized here. When a ray of light or other radiation travelling in a dense medium crosses an interface into a medium of lesser density, the ray is bent or refracted at an angle which is a function of the incident angle and the ratio of the indices of refraction of the two media. This relationship is known as Snell's Law, or $$n_1 \sin \phi_1 = n_2 \sin \phi_2$$

where an incident ray at an angle $\phi_1$ to the normal of the plane of the interface of the first medium of refractive index $n_1$ leaves the interface at an angle $\phi_2$ with respect to the normal, travelling now in a second medium of refractive index $n_2$. If the second medium is a gas such as air or is a vacuum, the refractive index will be very nearly 1. It may be seen that there is an angle $\phi^*$ of the incident ray which will cause the exiting ray to leave the interface at an angle of 90°, or parallel to the plane of the interface. This will occur when $\sin \phi_1 = 1/n_1$, at which point the angle is denoted the "critical angle" $\phi^*$. Thus $\phi^* = \sin^{-1} (1/n)$, and at any angle greater than $\phi^*$, the ray will not cross the interface but will be totally internally reflected at an angle equal to the incident angle $\phi_1$. For most transparent optical materials the refractive index lies within the range of 1.4 to 1.7, which results in a critical angle between 36° and 45°.

If, however, a ray is totally internally reflected and a third dense medium is brought into contact with the interface of the first medium, the ray will no longer be reflected and will pass into the third medium. This is known as "frustrated total internal reflection."

Not so well known is the behavior when the first and third media are separated by a thin layer of the second medium. In this case a portion of the incident radiation will be internally reflected and a portion will be transmitted through the interface into the third medium according to the relationship $$R/T = A \sinh^2 (B d/\lambda)$$

(sinh refers to the hyperbolic sine function)

where R is the reflected portion, T is the transmitted portion, $d$ is the thickness of the intermediate layer, $\lambda$ is the wavelength of the incident radiation and A and B are functions of the refractive indices and the incident angle. It may be shown that for an incident angle of 45° and a first medium refractive index of 1.5, some 98% of the incident radiation is internally reflected when the second medium layer separates the first and third media by a distance d equal to one wavelength of the subject radiation. Likewise when the two media are separated by only one-quarter wavelength, about half of the illumination will be transmitted and half will be reflected.

It will thus be seen that through application of this principle, it is possible to cause a pronounced change in the appearance of an indicator by a movement or displacemnt of extremely miniscule dimension. With such an indicator, the incident illumination will change from being totally transmitted to being almost totally reflected within a separation displacement of one light wavelength, a distance of about 20 microinches (0.5 micrometer).

It will be understood from the preceding that it is quite important that the two surfaces 24 and 26 be installed in exact registration, so that the peaks of one surface fit quite closely into the valleys of the complementary surface. One means of accomplishing this condition might be to cast light absorbing member 22 in place from a plastic or elastomeric resin while in contact with reflecting surface 24. It has been found in practice that black silicone RTV rubber may be successfully cast in this manner after coating microprism surface 24 lightly with a suitable release agent. Alternatively, member 22 may be formed externally from a sheet plastic or elastomeric material and fastened adhesively in place while being held in registration with the reflective surface.

In the tension-indicating fastener of FIG. 1, longitudinally extending members 28 are attached at one end to the ferrule 20 and attached at their other end to the body of the fastener at points 30 at a location remote from the head 12, as by staking or spot welding operations. Members 28 may lie within shallow grooves 32 formed into the body of the bolt during manufacture to present a smooth and flush exterior surface, or alternately may lie outside of the shank for less demanding applications. Openings 34, connecting the interior of recess 16 with the underside of head 12 and grooves 32, allow passage of extension members 28 through the head 12 to reach remote attachment points 30. If it is desired to seal the unit against moisture and contamination, the spaces between ferrule 20 and recess 16 and between extensions 28 and openings 34 may be filled with a suitable sealant such as silicone rubber, which is flexible enough to allow the small relative displacements accompanying operation.

In operation, light transmitting member 18 and light absorbing member 22 are normally separated by a thin gap of air of a thickness on the order of a few thousandths of an inch in the unloaded condition. When a load is applied as by tensioning or wrenching, the body of the bolt will elongate uniformly along its length according to Hooke's Law causing the distance between the head end 12 and the threaded end 14 to be increased. Light transmitting member 18 is attached indirectly to remote attachment points 30 near the threaded end 14 of the bolt, and light absorbing member 22 is attached directly to head 12. It is thus seen that elongation of the shank of the bolt will cause a relative displacement of members 18 and 22 tending to diminish the thickness of the separating air gap. When the calibration load has been reached, the under surface 24 of member 18 will be barely contacting the upper surface 26 of member 22, and the indicator will make a transition from a bright to a dark appearance.

The tension-indicating fastener of FIG. 1 may be calibrated during assembly to exhibit the indicating transition at any desired tensile load. This may be accomplished by first assembling the components completely as shown in FIG. 1 except for attachment of the extensions 28 at points 30. The fastener is next placed in a tensile testing machine or other precise tensioning device and brought up to the desired indicating load. While maintaining the proper load, the indicator members are lightly pressed into intimate registration and the extensions 28 are fastened to points 30. Upon release of the tension the indicator elements will separate and the indicator will present a bright appearance. During any subsequent tensioning of the fastener, the indicator will remain in a bright condition as the load is increased until the calibrated level is attained. At this level the indicator will make a relatively rapid transition from bright to dark, which appearance will remain in spite of further tensioning. If the loading is later diminished, the indicator will revert again to its bright appearance at the calibration point providing dramatic indication of the undertensioned condition.

Figure 2:
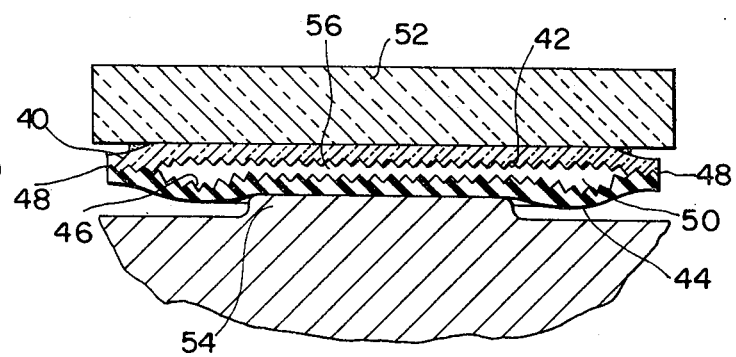
FIG. 2 is a partial elevational cross-sectional view of another embodiment of the invention, in which the two members are bonded in registration at their outer edges.

FIG. 2 illustrates a second embodiment of the microindicator in accordance with the present invention, more suitable for economical mass production techniques. The indicator is shown comprising a circular light transmitting member 40 corresponding to member 18 of FIG. 1, member 40 having light-reflecting microprism surfaces 42 formed into its undersurface, and a flexible light absorbing member 44 corresponding to member 22 of FIG. 1, which has its upper surface 46 in the form of a negative replica of the reflective surfaces 42 of member 40. Surfaces 42 and 46 are complementary to each other and engage intimately when in registration. Members 40 and 44 are sealed together at their outer periphery 48 after being placed in exact registration, thus preserving the registration in spite of handling. The peripheral seal at 48 serves the additional function of sealing the interior surfaces 42 and 46 against the deleterious effects of moisture and contamination which may otherwise interfere with their optical properties. The enclosed volume 50 within the sealed members may be filled with a dry compressible gas such as dry nitrogen or air at a pressure slightly above ambient to facilitate separation of the surfaces without creating a partial vacuum.

The sealed microindicator is shown with its light transmitting member 40 attached to an upper transparent window member 52 as by means of an adhesive, and with light absorbing member 44 attached similarly to a second member 54, shown in the form of a raised disklike projection in an otherwise flat surface, between which the relative displacement is to be indicated.

As members 52 and 54 are displaced relatively towards each other, a separating gap 56 between surfaces 42 and 46 will be diminished until a contacting or nearly contacting condition is reached. At this displacement the illuminating light will cease to be totally internally reflected from microprism surfaces 42 and the appearance of the indicator face will make a transition from light to dark.

The indicator of FIG. 2 may be employed in many applications in which it is desired to indicate a small relative displacement. For example, it could be employed in the tension-indicating fastener of FIG. 1 in place of members 18 and 22 of that figure. Similarly, it will be appreciated that other variations of these embodiments as presented in FIGS. 1 and 2 are within the spirit of the invention. For example, it is possible to incorporate the functions of members 40 and 52 of FIG. 2 into a single member as shown in FIG. 1, member 18. In this case, flexible light absorbing member 44 would be sealed directly to the outer periphery of a rigid window member with microprism reflecting surfaces formed into its under surface. Variations in coloration of the members are also within the spirit of invention. For example, light transmitting members 18 or 40 may be tinted a bright color to present a vivid indication when illuminated with white or normal lighting, or light absorbing members 22 or 44 may have some light reflective properties such as being brightly colored, which color would be visible through the light transmitting members when the two members are in contact.

Figure 3:
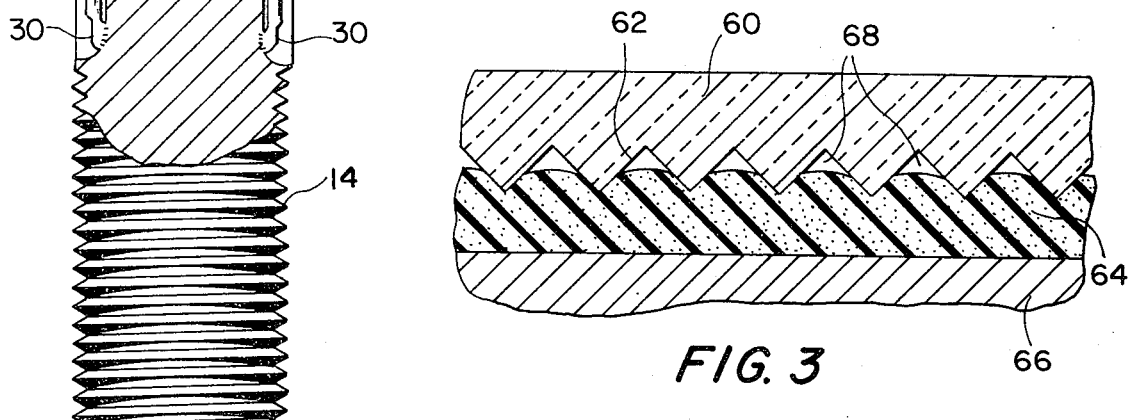
FIG. 3 is a partial elevational cross-sectional view of another embodiment of the invention.

FIG. 3 illustrates a greatly magnified sectional portion of another embodiment of an indicator in accordance with the present invention. In this indicator, there is an upper light transmitting member 60 with a lower reflective surface 62. Member 60 corresponds to the member 18 of the first embodiment. As shown in FIG. 3, the apices of the reflective surface 62 are partially embedded in a light absorbing soft resilient elastomeric member 64 which is attached to a rigid member 66. With members 60 and 64 in the position illustrated, a portion of the incident light is absorbed in member 64 where there is no air gap, and remaining incident light striking the surface 62 above the triangularly shaped air pockets 68 is reflected back out the upper surface of member 60. Thus, as the first member 60 is forced downwardly into second member 64, there is a gradual change from bright to dark corresponding to the increasing area of contact between the two members. In this embodiment, the average brightness of the indicator is proportional to the amount of displacement, as opposed to a more rapid transition from one extreme to the other as in the first embodiment.

Figure 4:
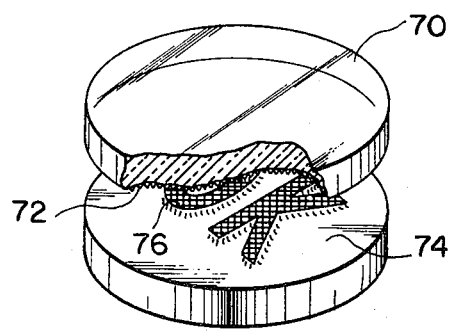
FIG. 4 is an exploded view of a modified indicator absorbing raised indicia on the upper surface of the light absorbing member.

FIG. 4 illustrates a further embodiment of the invention in which the indicator comprises a transparent light transmitting member 70 with the reflective lower surface 72 as in the other embodiments. A second member 74 has light absorbing indicia 76 which in the illustrated embodiment comprise the raised letters "OK" on its upper surface. When the two members are slightly separated, incident illumination will be largely totally internally reflected from surface 72 and the indicia will not be visible to an observer. However, when the two members are in contact with each other, light is absorbed in the raised surface 76 so that the message is displayed as dark letters in a bright background. In this embodiment when there is a displacement and the two members of the indicator move apart from each other, the formation of an air gap above the indicia 76 will cause the message to disappear and thus signal that a potentially dangerous displacement has taken place.

Figure 5:
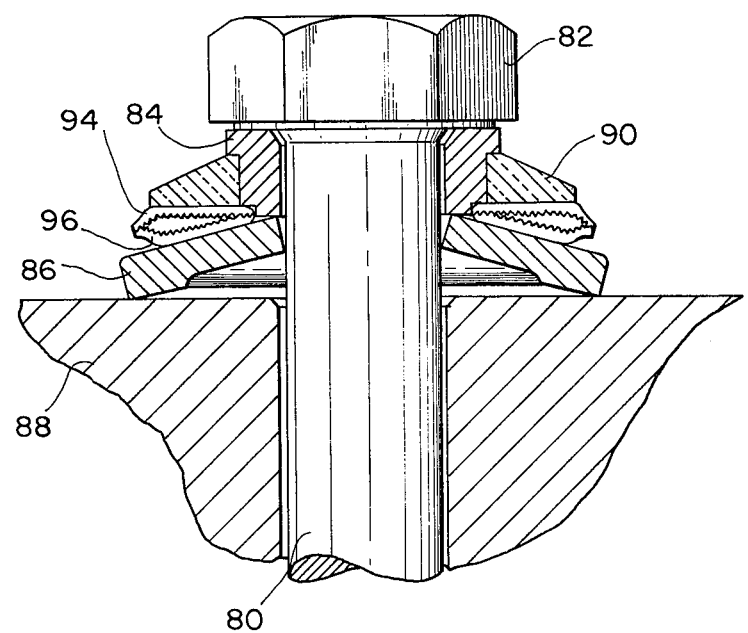
FIG. 5 is a sectional elevation view of an unstressed conventional structural fastener used with a load-indicating washer incorporating another embodiment of the indicator.
Figure 6:
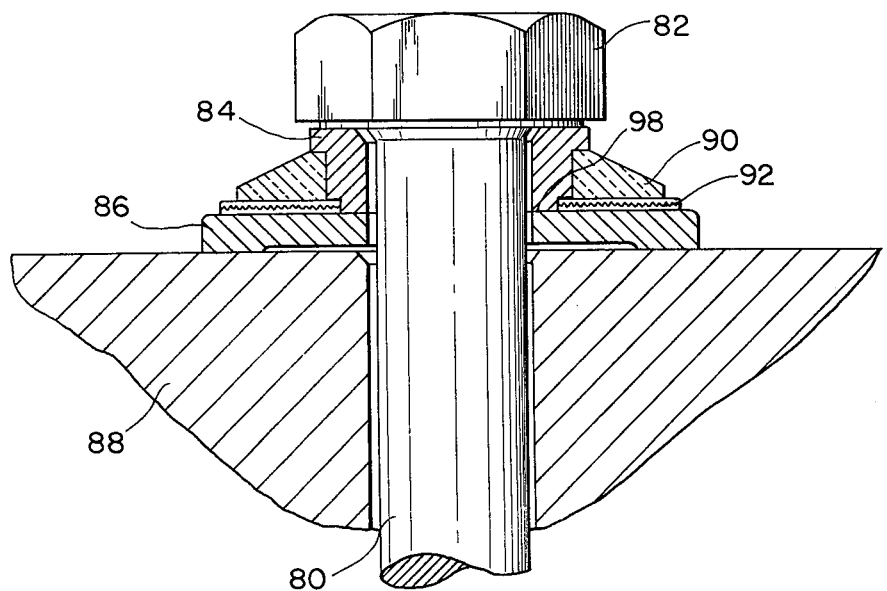
FIG. 6 is a view similar to FIG. 5 but showing the fastener in a stressed condition compressing the indicator.

FIGS. 5 and 6 illustrate another embodiment of the microindicator in accordance with the present invention, in which the indicator is applied to a load-indicating washer assembly which indicates the proper preloading tension applied to an ordinary fastener. FIG. 5 shows the load-indicating washer assembly in an uncompressed condition, and FIG. 6 shows the assembly when the fastener has been tightened to the proper clamping load. An ordinary structural bolt 80 is shown having a head 82, the underside of which bears on an annular bearing member 84, which in turn bears on the inner diameter of conical spring washer 86 which is in the form of a Belleville or similar deflecting spring washer. Spring washer 86 bears at its outer diameter on structure 88 which is to be clamped by bolt 80. Spring washer 86 is proportioned such that the load to flatten the washer corresponds with the desired indicating load. An annular transparent window member 90 encircles bearing member 84 and is fastened at its inner diameter to member 84 as by staking or an adhesive.

An indicator element 92 is disposed in between window member 90 and spring washer 86. Indicator 92 comprises an upper light transmitting member 94 having light reflecting surfaces formed into its undersurface and a lower flexible light absorbing member 96 having its upper surface formed into a closely fitting negative replica of the under surface of member 94. Member 94 corresponds to member 40 of FIG. 2 and member 96 corresponds to member 44 of that figure. Indicator 92 is configured in the shape of a washer or flattend torus, having a central circular hole to accommodate through passage of the body of bolt 80. Members 94 and 96 of indicator 92 are sealed together both at their inner diameter and at the outer periphery. The light transmitting member 94 is fastened as by a clear adhesive to the flat under surface of annular window 90 and the light absorbing member is similarly fastened to the flat upper surface of spring washer 86. Annular bearing member 84 must be bonded to or keyed to spring washer 86 at one or more locations 98 as by a light spot weld to prevent relative rotation between the two members during wrenching.

When bolt 80 is loose or insufficiently tightened the load-indicating washer assembly will be incompletely compressed as shown in FIG. 5, and a substantial air gap between members 94 and 96 will cause a bright indication to be seen through annular window 90. Conversely, when tightened to the proper indicating load, the washer assembly will be compressed as shown in FIG. 6. At this correct tension the indicator members will be forced into intimate contact, eliminating the air gap and causing a dark indication to be presented through window 90.

When the retroreflective microindicators of any of the embodiments of this invention are attached to the heads of mine roof bolts so as to provide a signal upon a prescribed elongation of the bolt, indication would correspond to a given amount of tensile stress applied to the bolt. If that tensile strength were exceeded due to movement of the mine roof, the face of the indicator would change dramatically from a dark color to a retroreflective bright yellow, red or other color. This color change would be quite noticeable to nearby mine workers because of light reflected back to them from their head lamps. Indeed, tests have shown that in darkness, an indicating bolt is observable 75 to 100 feet away with the light from an ordinary flashlight. The indicator could thus provide advance warning of potentially dangerous condition of the mine roof.

It will be appreciated that there are many other uses and applications for the indicators of the present invention. The illustrated embodiments are intended in an illustrative sense and not as placing a limitation on the invention. Accordingly, it is intended to encompass all changes and modifications which would suggest themselves to one of ordinary skill in the art upon being apprised of the present invention, and which changes and modifications fall within the scope and spirit of the appended claims.

What is claimed is:

1. A displacement indicator comprising a light transmitting member having two opposite surfaces and a light absorbing member disposed at one surface of said light transmitting member, said one surface of said light transmitting member having a faceted light reflective configuration, said light transmitting member and said light absorbing member being moveable relative to each other between two end positions, in one end position said light reflective surface of said light transmitting member is in intimate contact with the adjacent surface of said light absorbing member whereby incident light passing through said light transmitting member is absorbed by said light absorbing member and in the other end position said members are spaced from each other producing an air gap between said reflective surface and said adjacent surface of said light absorbing member whereby incident light is internally reflected at said reflective surface and passes out of said light transmitting member.

2. An indicator according to claim 1, wherein said light reflective configuration is comprised of internally reflecting microprisms.

3. An indicator according to claim 2, in which said internally reflecting microprisms are corner-cube retroreflectors.

4. An indicator according to claim 1, wherein said adjacent surface of said light absorbing member is a negative replica of said reflective surface of said light transmitting member.

5. An indicator according to claim 1, wherein said light absorbing member is comprised of a soft, dark material.

6. An indicator according to claim 1, wherein at least one of the light transmitting member and the light absorbing member is composed of a flexible sheet material.

7. An indicator according to claim 1, wherein the light transmitting member and the light absorbing member are sealed together at their free edges.

8. An indicator according to claim 1, further comprising indicia on said adjacent surface of said light absorbing member, said indicia being visible through said light transmitting member when said members are in the end position in which said members are in intimate contact.

9. An indicator according to claim 1, further comprising means for attaching said light transmitting member to a first point and means for attaching said light absorbing member to a second point, so as to indicate a relative displacement occurring between said first and second points.

10. An indicator according to claim 1, further comprising a strainable member responsive to an applied stress load, means for attaching said light transmitting member to a first portion of said strainable member, and means for attaching said light absorbing member to a second portion of said strainable member, there being a relative displacement between said first and second portions of said strainable member upon application of a stress load thereto.

11. An indicator according to claim 10, wherein said strainable member is the shank portion of a tensile fastener.

12. An indicator according to claim 11, wherein said first portion of said strainable member is in the vicinity of the end remote from the head end, and said second portion is in the vicinity of the head end of the fastener, said means for attaching said light absorbing member to said first portion comprises a plurality of elongated members disposed outside of and substantially parallel to the shank portion of said tensile fastener, one end of said elongated member being attached to said first portion and the other end being attached to said light transmitting member.

13. An indicator according to claim 10, wherein said strainable member is a spring washer.

* * * * *